(12) United States Patent
Foti (10) Patent No.: US 9,311,111 B2
(45) Date of Patent: Apr. 12, 2016

(54) PROGRAMMING ENVIRONMENT WITH SUPPORT FOR HANDLE AND NON-HANDLE USER-CREATED CLASSES

(75) Inventor: David A. Foti, Tolland, CT (US)

(73) Assignee: The Mathworks, Inc., Natick, MA (US)

( * ) Notice: Subject to any disclaimer, the term of this patent is extended or adjusted under 35 U.S.C. 154(b) by 1372 days.

(21) Appl. No.: 12/170,893

(22) Filed: Jul. 10, 2008

(65) Prior Publication Data

US 2009/0077536 A1     Mar. 19, 2009

Related U.S. Application Data

(60) Provisional application No. 60/959,340, filed on Jul. 12, 2007.

(51) Int. Cl.
    *G06F 9/44*     (2006.01)

(52) U.S. Cl.
    CPC .............. *G06F 9/4433* (2013.01); *G06F 8/315* (2013.01)

(58) Field of Classification Search
None
See application file for complete search history.

(56) References Cited

U.S. PATENT DOCUMENTS

| | | | | |
|---|---|---|---|---|
| 4,901,221 A | * | 2/1990 | Kodosky et al. | 715/771 |
| 4,914,568 A | * | 4/1990 | Kodosky et al. | 715/763 |
| 5,291,587 A | * | 3/1994 | Kodosky et al. | 703/2 |
| 5,301,338 A | * | 4/1994 | Yamaura et al. | 712/1 |
| 6,085,198 A | * | 7/2000 | Skinner et al. | 707/999.101 |
| 6,226,692 B1 | * | 5/2001 | Miloushev et al. | 719/316 |
| 6,857,118 B2 | | 2/2005 | Karr et al. | |
| 6,901,588 B1 | * | 5/2005 | Krapf et al. | 717/164 |
| 7,051,333 B1 | * | 5/2006 | Nylander et al. | 719/310 |
| 7,051,338 B1 | | 5/2006 | Foti et al. | |
| 7,181,745 B1 | | 2/2007 | Foti | |
| 7,237,237 B2 | | 6/2007 | Foti | |
| 7,289,964 B1 | * | 10/2007 | Bowman-Amuah | 705/1.1 |
| 7,849,470 B2 | | 12/2010 | Nylander et al. | |
| 7,984,416 B2 | | 7/2011 | Foti | |
| 8,069,178 B1 | | 11/2011 | Black et al. | |
| 8,826,229 B2 | | 9/2014 | Foti | |
| 8,966,456 B2 | | 2/2015 | Foti | |
| 9,015,661 B1 | | 4/2015 | Black et al. | |
| 2002/0069400 A1 | * | 6/2002 | Miloushev et al. | 717/108 |
| 2012/0197944 A1 | * | 8/2012 | Foti | 707/798 |

OTHER PUBLICATIONS

Cline, Marshall. "[31.1] What is value and/or reference semantics, and which is best in C++?" in C++ FAQ. Added Jul. 1999. pp. 1-4. Retrieved from http://www.parashift.com/c++-faq/val-vs-ref-semantics.html on Sep. 26, 2012.*

Jargon File "syntactic sugar". Retrieved from http://www.catb.org/jargon/html/S/syntactic-sugar.html on Sep. 27, 2012.*

(Continued)

*Primary Examiner* — Emerson Puente
*Assistant Examiner* — Erika Kretzmer
(74) *Attorney, Agent, or Firm* — Cesari and McKenna LLP; Michael R. Reinemann (57) ABSTRACT

A language processing environment provides facilities for defining and using handle classes. A handle class is a class that always and only exists as a handle to stored data, yet that data is accessed in the same manner as with non-handle classes. The language processing environment provides syntax such that all values in the language are members of some class and all classes are defined using the same syntax. Methods and properties are supported on both handle and non-handle classes.

33 Claims, 5 Drawing Sheets

(56) References Cited

OTHER PUBLICATIONS

Microsoft. "typeof Goes to T::typeid" in Visual Studio 2005 C++/CLI Migration Primer. Retrieved from http://msdn.microsoft.com/en-us/library/ms235260 on Sep. 27, 2012.*

Stroustrup, Bjarne. "C++ Style and Technique FAQ: Why doesn't C++ have a universal class Object?" Modified Jun. 8, 2014. Retrieved from http://www.stroustrup.com/bs_faq2.html on Dec. 24, 2014. pp. 1, 2, 26 and 27.*

Sutter, Herb, "A Design Rationale for C++/CLI," retrieved online at http://www.google.com/search?sourceid=navclient&ie=UTF-8&rls=SUNA,SUNA:2006-12,SUNA:en&q=A+Design+Rationale+for+C%2b%2b%2fCLI (2006).

The MathWorks, "MATLAB® 7, Object-Oriented Programming," The MathWorks, Inc., (2008).

Wikipedia, "Reference (computer science)," retrieved online at http://en.wikipedia.org/wiki/Computer_science (2007).

Wilson, Matthew, "Identity and Equality: Syntax and Semantics," retrieved online at http://www.ddj.com/cpp/184401714 (2003).

International Search Report for Application No. PCT/US2008/008549, dated Nov. 3, 2008.

"MATLAB® 7 Programming," The MathWorks, Inc., Mar. 2007, pp. 1-865.

Shebanow, Andy, "Using C++ Objects in a Handle-Based World," MacTech Magazine, Xplain Corporation, Apr. 1990, pp. 1-10.

"Technical Note TN1009: On Multiple Inheritance & HandleObjects," Apple Computer, Inc., Oct. 1995, pp. 1-8.

\* cited by examiner

PROGRAMMING ENVIRONMENT WITH SUPPORT FOR HANDLE AND NON-HANDLE USER-CREATED CLASSES

RELATED APPLICATION

The present application claims the benefit of U.S. Provisional Patent Application No. 60/959,340, filed on Jul. 12, 2007, the content of which is incorporated by reference in its entirety.

BACKGROUND

Many programming languages, including graphical and/or textual programming languages, offer support for object-oriented programming. Even languages not historically designed for object-oriented programming, such as, for example, C, may be adapted for some or all of the object-oriented programming concepts, such as, for example, inheritance, encapsulation, polymorphism, etc.

Object oriented programming typically involves defining one or more classes, which may be instantiated during execution of program code. In object-oriented programming, an instantiation of a class is referred to as an "object." Multiple objects may be instantiated from a single class. A class may define standard characteristics of objects that may be instantiated from it. Such characteristics may include attributes, such as fields or properties an object may have, and methods—things that an object is capable of doing. For example, if a class defines a property "a," different objects—different instances of that class—may have different values for "a." Similarly, if a class defines a method "do_a," all objects of that class will be able to execute the method "do_a" on the appropriate input.

Object-oriented programming may involve class inheritance, where one class (often referred to as a "subclass" or a "child class") "inherits" from another class—that is, extends the characteristics of that class. The class from which a subclass inherits is referred to as a "parent class" or a "super-class." Inheritance may involve adding characteristics such as methods or properties, or specializing the existing characteristics of a class definition. There may be multiple levels of inheritance—that is, a subclass may be a super-class for another subclass and so on. Some languages allow for multiple-inheritance, where a subclass may inherit from two or more classes at once.

In some languages, there may be some differences between built-in constructs, such as, for example, literals (values, such as numbers, specific strings, etc.), and/or primitive variable types, etc. and objects. In other languages, all constructs may be treated as equal. The differences or lack thereof may show up in the way different constructs are referred to, and/or the way they are used, what operations may be possible on them, how they are treated by compilation or execution engines, etc. In some languages, objects may have references or "pointers" pointing to them. Objects may be accessed through pointers or through other means. In some cases, values of variables in an object may be modified using appropriate syntax on a pointer. In other cases, a language may have a concept of an object separate from its pointer. In yet other cases, mixed usage may be allowed.

Programming languages may have various characteristics, such as being compiled and/or interpreted, statically typed and/or dynamically typed, textual and/or graphical, etc. In addition to the variety of programming languages available, there is a large variety of tools that a programmer may use to develop, review, analyze, test, and/or execute program code. For example, code may be written in an editor—anything from a simple text editor, to specialized program code editors, analyzed and/or tested by hand or by automated tools, such as static checkers, automatic test suits, etc., and executed directly in an operating system environment or in a specialized compile-based or interpretive environment.

There may be tools assisting programmers in various code development stages, such as, for example, integrated development environments (IDEs) that allow programmers to write and compiled and/or test their code. Alternatively, there may also be programming environments that allow for development and execution of code. One such programming environment is the MATLAB® programming environment from The MathWorks, Inc. of Natick, Mass. The MATLAB® programming environment supports a dynamically typed array-based language, referred to as MATLAB code herein.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Different languages take a different approach towards object classing. For example, in some languages, such as Java, all objects are derived from a single base class. In other languages, such as, for example, C++, there is no universal base class to which all classes are related.

While a system in which all classes have a universal base class at the top of their inheritance chain has its benefits, there may be advantages to having more than one base class. For example, it may be advantageous to distinguish classes with certain characteristics particularly appropriate for those classes. One such group of classes may be referred to as "handle classes"—that is, classes used exclusively through a reference to them.

In one embodiment, a language class system is provided, in which there are at least two basic base classes: a handle base class and a non-handle base class. That is, any object in the system has one of the two types of classes at the root of its inheritance tree. A universal handle class characterizes things that are common to all handles.

Handle classes are useful to characterize a class of objects where no two objects may be identical. For example, such objects may be GUI elements such as windows, frames, buttons, switches, sliders, dials, other kinds of controls, etc. They may also be file pointers, system resources, pipes between objects and/or applications, etc. With such objects, multiple variables and contexts may refer to exactly the same object. Passing the object from one context to another may not create a copy that can change independently of the original object. Assignment of the object from one variable to another also does not result in more than one distinct object state.

Handle classes may be useful for objects where no two objects can be exactly identical—that is, no two objects may be in an identical state at the same time. Put another way, no two objects may have all of their state variables set to identical values at the same time. There are a number of situations where having two or more identical objects may be impossible. For example, an object may be a file on disk. There can only be one file on disk at with exactly the same file name or physical location. Another example of an object that may benefit from the restriction on duplication is an object representing a portion of a user interface—for example, a window. No two windows on the display may be in the same position and stacking order on the screen. One window is always considered to be in front of another, even if both of them are obscured. In both of these cases, an exact copy of an object cannot be made. In these cases, an embodiment may be configured such that a copy operation always involves creating two instances with slightly different state.

Yet another example of an object in need of uniqueness may be a function handle or a reference to a function. A function handle state may include executable code and a name of a function, both of which are unique in a given scope and/or environment. For example, function handles may need to be unique in an executing environment. Function handles are described in U.S. Pat. No. 6,857,118 entitled, "Function Values in Computer Programming Languages Having Dynamic Types and Overloading," which is incorporated herein by reference in its entirety. Therefore, it may be beneficial to represent function handles, user interface elements, file handles, etc., with objects that may not be duplicates of each other.

Other objects may also need to be unique, depending on the usage. For example, in case of a singly-linked list made up of nodes that point to each other, a node may be unique because of its context. No two nodes in a singly-linked list can have the same next node in the list, and, therefore, a node in such a list may benefit from being represented as a handle object.

In one embodiment, classes inheriting from a handle base class may be created and/or used using the same syntax as other, non-handle based classes. For example, such syntax may be MATLAB, C++, or Java class creation syntax, or, alternatively, syntax from any object-oriented language. One such language may be MATLAB code or another array-based language, or a language at least a subset of which is executable in the MATLAB® programming environment.

A number of currently available languages have pointers or different type of classes, but that is not the same as having a built-in capability to use the same semantics to create and/or use both handle and non-handle classes, where handle objects are guaranteed uniqueness. For example, the C++ programming language has pointers and non-pointers, but the class of an object is separate from whether or not a pointer is used. It is not possible in C++ to define a class such that it must always exist only in pointer form. Different techniques may be attempted to prevent a class from being instantiated except as a pointer. For example, a class designer may hide the constructor so that only static methods in the class are allowed to construct instances. This can be used to ensure that instances are always created as pointers. The class designer would then need to provide a private overload for operator "*" to ensure that a pointer to an object may not be de-referenced. A user may have to inspect all methods of the class in order to know that a class can only exist as pointers. There is no explicit way to specify this behavior in C++. There is no standard way to query at run-time if an object can exist only as pointers. C++ also uses different syntax to access objects by value (non-handle objects) or by pointer.

In other languages, such as, for example, in C#, there are reference types and value types. Value types include the primitive numeric scalar types, enumerations, and structs. Classes are always reference types. Thus, different syntax is used to define types with value or handle semantics, unlike in illustrative embodiments described herein.

For the purposes of illustration, a number of examples herein are discussed with reference to MATLAB code, a dynamically typed array-based programming language from The MathWorks, Inc. of Natick, Mass. It should be appreciated that MATLAB code has been chosen as a singular example of a programming language that supports object-oriented programming. MATLAB code may have a particular set of class/object notation that's adapted for use in dynamically typed languages. References made herein to MATLAB code in discussing specifics of the class/object usage notation may be applicable to other textual and/or graphical programming languages and other types of programming languages that enable definition of derived classes.

An array-based language may have built-in language constructs that provide a class designer with tools necessary to efficiently and quickly construct classes that take full advantage of a dynamically typed array-based programming environment that supports object-oriented programming concepts. They may also provide syntax necessary to perform element-wise operations in class methods and to quickly create derived classes from base classes using mathematical set notation, as described in the U.S. patent application Ser. No. 11/389,636, which is incorporated herein by reference in its entirety. In such a manner, handle classes may be derived from a handle base class or other handle classes. Likewise, non-handle classes may be derived from a non-handle base class and other non-handle classes. The syntax and notation for creating handle and non-handle classes may be the same, and whether a class belongs to a particular group of classes (handle or not-handle) may be discovered using additional language tools, as discussed below.

Figure 1:
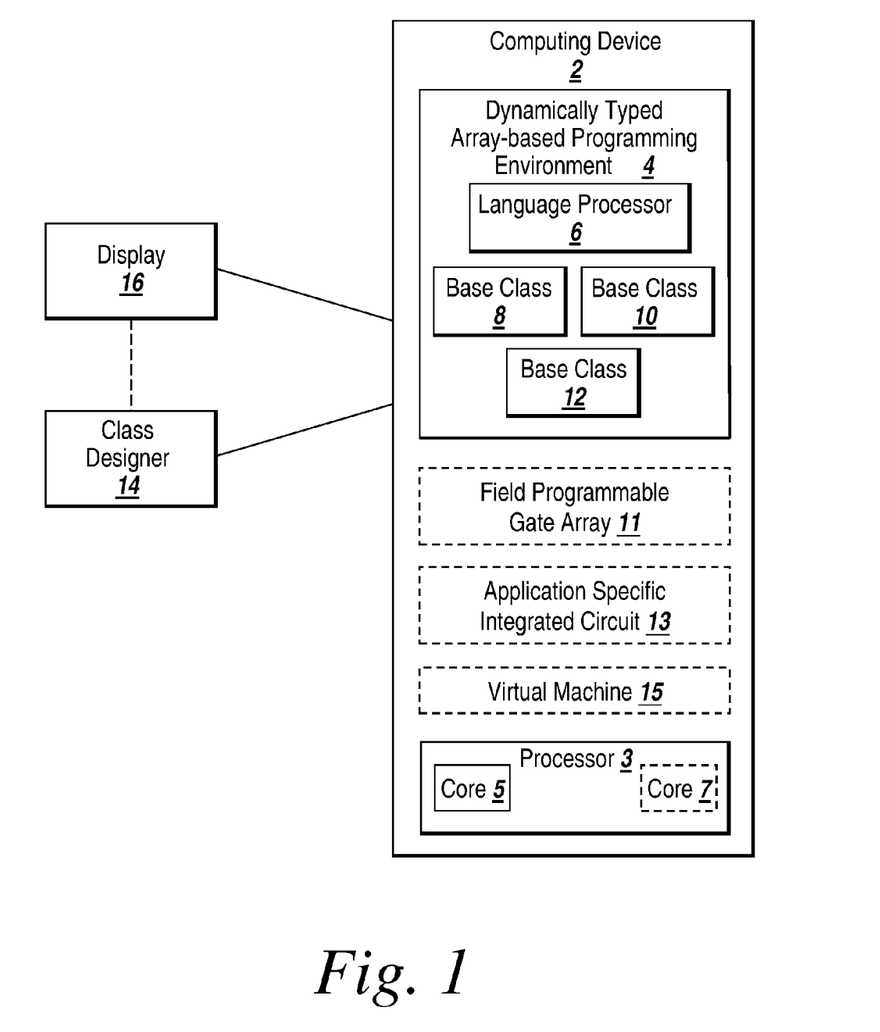
FIG. 1 is a schematic illustration of an environment suitable for executing commands in a programming language having different base classes.

FIG. 1 is a schematic illustration of a system suitable for creating code utilizing object-oriented concepts. A computing device 2 may host a dynamically typed array-based programming environment 4. The exemplary computing device 2 may be a computer, a processor, a core in a multi-core processing system, a portable computing device, a thread, an application, an execution unit, etc. The computing device 2 may be a virtualized device. The computing device 2 may be equipped with a single processor, a multi-core processor or multiple processors. By way of example, FIG. 1 shows a processor 3 with multiple cores 5 and 7. The processor may be a 32 bit processor, 64 bit processor or other type of processor capable of executing the instructions provided in a programming language or in a representation derived from code in the programming language, such as, for example, a graphics processing unit (GPU) or application specific hardware that is either programmable (Field Programmable Gate Array) of fixed (Application Specific Integrated Circuit).

The dynamically typed array-based programming environment 4 may be an environment capable of interpreting and executing commands in MATLAB code. Alternatively, it may be an environment capable of compiling and/or executing commands in MATLAB code. In an alternative embodiment, the programming environment 4 need not be an environment designed for processing array-based and/or dynamically typed languages, and may be any kind of programming environment adapted for processing and/or interpreting and/or executing programming code, as deemed appropriate by one of skill in the art.

The programming environment 4 may have additional features, such as, for example, allowing for creation of code or importation of programming code from other applications for execution. The programming environment 4 may also provide tools for testing, analyzing and/or documenting programming code. In yet another embodiment, the programming environment 4 may provide tools for generating one or more intermediate representations from the programming code written or imported into the programming environment 4. An intermediate representation may be a control flow graph, a graphical illustration, code in a different programming language, optimized or augmented code in the same programming language as the original code, code in machine language, a representation using aspects of a Unified Modeling Language (UML), a representation using aspects of a hardware description language (HDL), etc. For example, the programming environment 4 may allow for compilation of MATLAB code into executable C code or executable code adapted for various execution platforms. The programming environment 4 may also optionally provide other tools, such as, for example, tools for static analysis or automatic test suit generation for the programming code.

The programming environment 4 may include a language processor 6 capable of processing program code written in a dynamically typed array-based language. In an alternative embodiment, the language processor 6 may be capable of processing code including commands from more than one programming language. In yet another embodiment, the language processor 6 need not be a part of the programming environment 4, and may be coupled with the programming environment 4 or may be a stand-alone application, capable of being invoked either from inside or outside of the programming environment 4. In one embodiment, the language processor 6 may support the use of an element-wise attribute for methods defined in a class that specifies operations to be carried out on all elements in an array and set notation in class definitions that facilitates class inheritance. The element-wise attributes and set notation are discussed in further detail below.

The programming environment 4 may also include or be capable of processing one or more class definitions for base classes, such as, for example, base classes 8, 10 and 12. The language-provided base classes may be referenced by a class designer 14 using the set notation or any other notation for class creation and use. Alternatively, base classes may be referenced by a programmer programming in language of the programming environment 4 to create and/or use new classes or objects in existing classes (regardless of whether the programmer designs new classes). The class designer 14 may interact with the programming environment via a display 16 that is in communication with the computing device 2. There may be additional input and/or output devices and/or other devices or parts connected to the system 2.

FIG. 1 is only one of multitude possible systems capable of being used to implement embodiments of the present invention. There may be various alternate implementations, as determined by one of skill in the art. For example, one such alternate implementation may be implemented in a distributed architecture, such as that shown in FIG. 2. A class designer or programmer 32 may be using a first computing device 34 and an associated (or separate) display device 36. The first computing device 34 may be in communication with a second computing device 20 over a network. The second computing device may host a dynamically typed array-based programming environment 22. The dynamically typed array-based programming environment 22 includes a language processor 24. The class designer 32 enters commands on the first computing device 34 that are transmitted to the second computing device 20 for execution. The results of the execution of the class designer's 32 commands are then transmitted over the network 30 to the first computing device 34, where they are displayed for the user on the display device 36.

Figure 2:
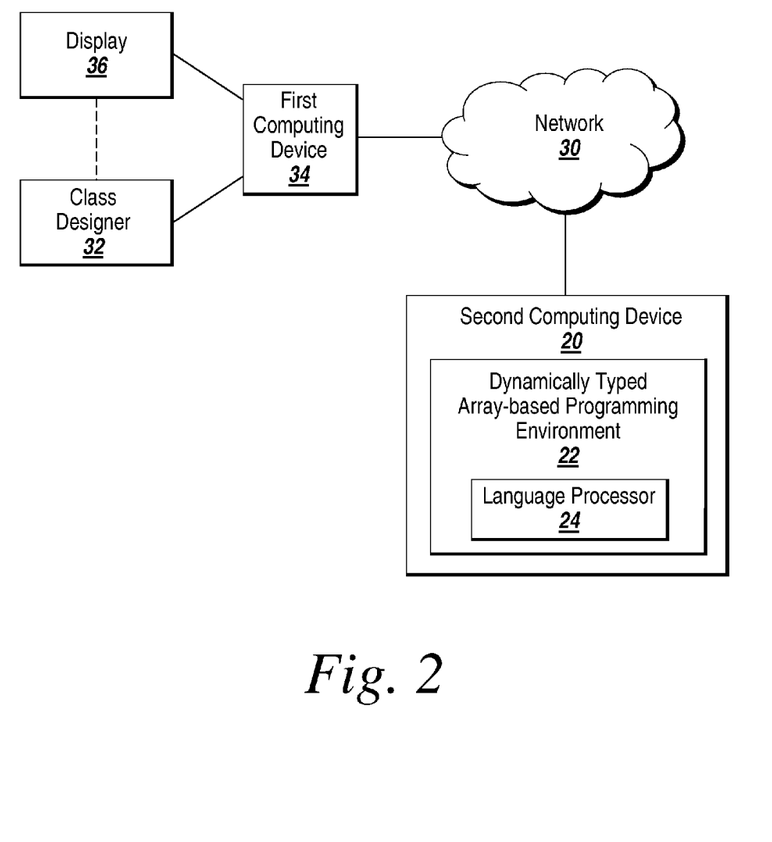
FIG. 2 is an alternative environment suitable for executing commands in a programming language having different base classes.

The second computing device 20 may be one or more computers or computing devices. It may also be a virtualized device. The network 30 may be the Internet, a local area network (LAN), a wide area network (WAN), a wireless network, an intranet or some other type of network. The second computing device 20 may be a dedicated computing resource or may be used to house other applications and/or processes. In an alternative embodiment, devices 34 and 20 may be set up in such a way that the communication between them is transparent to the user, and the user 32 may not be aware of the exact nature of the distributed architecture.

Programmers may choose to define one class in terms of another—that is, inheriting from another class. Programmers may use this approach because it is simpler to define a new class in terms of an existing class and simpler to learn how to use such a new class if there is already familiarity with the existing class. In some languages, class definitions may be limited to extending one or more of the offered base classes. In other languages, such inheritance to the universal base class may be implicit in the underlying language structure. In one embodiment, there may be a handle class universal base class and a non-handle class universal base class, the non-handle universal base class being distinguished from the handle class in that two objects of that class may be identical (have identical values) and that an assignment operation may result in a copy of an object being made. In another embodiment, there may be a handle base class and no universal non-handle base class.

In an embodiment, a set notation may be used to create new classes as subclasses of their base classes. Set notation may be used to create a new subclass from a single class or to indicate that a derived class multiply inherits from two or more base classes. In some conventional systems supporting multiple inheritance, such as, for example, in the C++ language, a class A may inherit from class B multiple times. This model of inheritance is not based on sets because a member of the set defined by class B cannot be a member of the set defined by class A multiple times. The C++ model may lead to confusion about how to refer to the properties and methods of each separate instance of class A that is embedded in class B. In contrast, one illustrative embodiment of the present invention provides an inheritance model based on sets in such a way that it defines multiple inheritance such that if a class C inherits from classes A and B, then C defines a subset of the intersection of A and B. The use of set notation provides that if class B is defined as a subclass of A and A, this is equivalent to defining a subset of the set intersection of A and A, which is A itself.

In an embodiment, the rules of the language may be defined such that a class is not allowed to inherit both from a handle base class and a non-handle base class. An attempt to define a class through such inheritance may return an error during definition, interpretation and/or compilation. In an alternative embodiment, multiple inheriting from a handle base class and a non-handle base class may be permitted, with rules defined as to which characteristics the new class takes on.

While a class defines a set of objects (or potential objects) with certain common attributes, such as method and variable names, a subclass defines a subset of objects sharing some additional attributes, such as additional variable names. The subclass is often a more specialized form of its parent class. One advantage to sub-classing is that it provides many possible ways to avoid code duplication by reusing existing code. For example, common code from two classes may be put into a method on the base class and called by methods of the subclass. The existence of a sub-classing relationship also makes it easier to document and use various classes.

Figure 3:
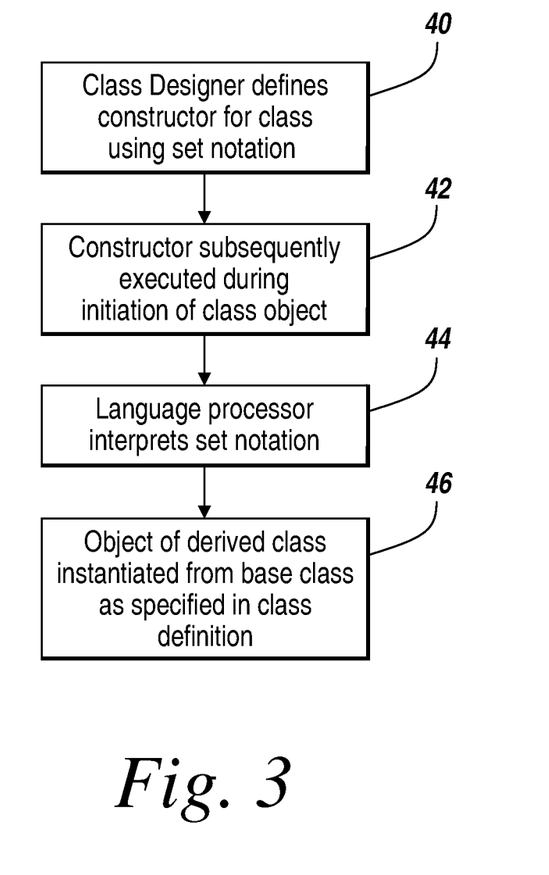
FIG. 3 is a flowchart of a sequence of steps followed by an illustrative embodiment of the present invention to derive classes using set notation.

FIG. 3 is a flowchart that illustrates a technique for deriving classes using set notation. The sequence begins when the class designer 32 defines a constructor for the class using set notation (40). The set notation may indicate that the class is derived from an intersection or union of two base classes. The base classes may be a universal base class and its derivatives or non-universal base classes. A "universal" base class, as referred to herein, is a base class that has no parent classes, not necessarily a base class that serves as a base class for every single object in the language. That is, in one embodiment, there are two universal base classes: a universal handle base class and a universal non-handle base class.

A constructor is called during instantiation of a class object (42), and the language processor interprets the set notation (44). An object of the derived class is then instantiated with the object inheriting from the base classes as specified in the class definition (46).

An illustrative embodiment of the present invention may also be extended to other textual and/or graphical programming languages in addition to the dynamically typed array-based programming language described herein. Graphical programming languages include UML and its variants, such as, for example, SysML, Modelica, Dymola, VHDL and VHDL-AMS, as well as the language of SIMULINK® modeling environment from The MathWorks, Inc. of Natick, Mass.

Different embodiments may have different syntaxes for creating handle classes and for manipulating handle objects. One concept that is common to what is meant by a handle class herein is uniqueness: a handle object is unique and no two handle objects may have exactly the same state—that is, no two handle objects may be in indistinguishable states. In one embodiment, uniqueness of handle objects is enforced through language-level means, such as, for example, either by a language compiler or interpreter and/or other tools built into a language processor. In an alternative embodiment, uniqueness of handles may be enforced by disabling assignment and/or copy operators on handle objects. In yet another embodiment, using assignment and/or copy operators may result in assigning the handle to another variable (that is, having two references to the same object) without creating a copy of the object itself.

Figure 4:
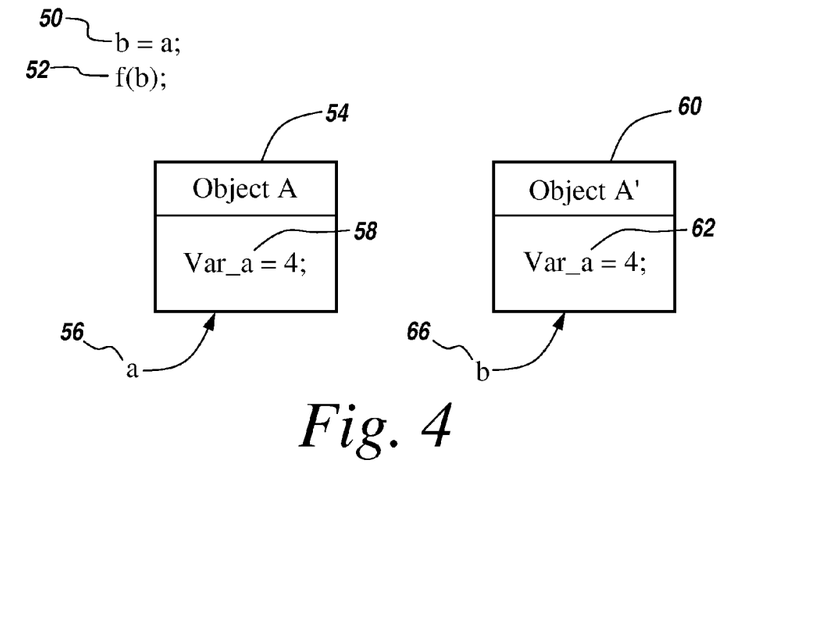
FIG. 4 is a schematic illustration of results of an assignment operation on a non-handle class.

Shown in FIG. 4 is a result of a copy/assignment operation on a non-handle object. For example, the copy operation may be accomplished using an "=" signal, as shown in line 50. Other embodiments may have different copy operators. The contents of the variable "a" 56 may correspond to object A 54, having at least one state variable "var_a" 58, which value is "2" at the time of the assignment operation. As a result of the assignment, a copy of the object A 54 is created (object A' 60), having the same state variables in the same state as the object A 54. The contents of the variable "b" 66 correspond to the object A'.

After the assignment of the contents of a variable "a" 56 to a variable "b" 66, a function may be called on variable "b," as shown in line 52. Function f(b) then changes the state of the object it's called on—that is, it updates at least one state variable of its input. For example, it may multiply value of "var_a" by two. As seen in FIG. 4, the state of the object A' 60 is updated with the new value for variable "var_a" 62, while the state of the object A 54 remains the same, as is the value of the variable "var_a" 58 of the object A 54. At this point the two objects are completely independent of each other, and, while they have similar internal variables, those variables can be in the identical or different states independently of each other. If all of the internal variables of two objects have the same values, in some languages, calling a comparison operator on them may return "true," while in others it may return "false," depending on the implementation and the operator called.

Figure 5:
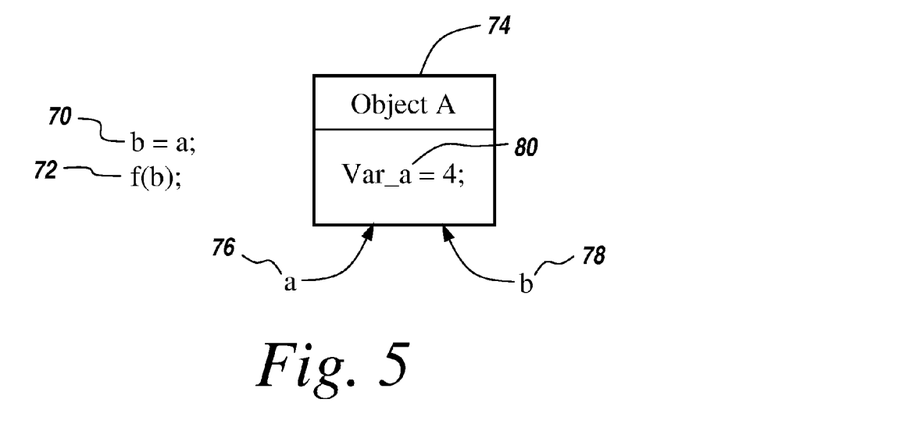
FIG. 5 is a schematic illustration of the result of an assignment operation on a handle class.

In comparison, shown in FIG. 5 is the result of the assignment/copy operation on a handle object. As shown in line 70, variable "b" 78 is assigned the contents of a variable "a" 76, after which the same function as in FIG. 4 is called on the variable "b" in line 72. Prior to the assignment, the contents of the variable "a" 76 (or what the variable points to) correspond to an object A 74. The assignment results not in a second copy of an object A 74, but in another reference—another handle—to the same object A 74. Using the variable "b" 78 as an input to the state-changing function results in the state of a variable "var_a" 80 to be changed, such that a query as to the state of that variable using either variables "a" 76 or "b" 78 would result in the same answer. A comparison operator applied to "a" and "b" should return "true" because they are identical handles for a single object.

The concept of uniqueness of handle objects allows for a definition of equality and non-equality of handles (references to handle objects) based on the identity of the underlying object. The underlying object may be a pointer, a file pointer, a pipe, a system resource handle, etc. In one embodiment, it is not necessary to test all state variables of two objects to determine equality between the objects, because no two different handles can have the exact same state for all of their state variables. Therefore, no two different handles can refer to identical underlying objects.

In one embodiment, a handle may be strictly defined through this definition for uniqueness. For example, it may be possible to say that a variable is a handle if and only if an assignment of the variable to another object does not result in a copy of the underlying object, and an application of the state-changing function to the assignee will change the state of the underlying object of the assignor as well. In a language having only pass-by-value semantics, calling a function on a handle may not change a handle to be a different object, but it may modify an object to which the handle refers.

In one embodiment, handles may be created by calling a constructor of a handle class. The handle class may be the universal handle base class or a class having a handle class as its base class. In the array-based language of the MATLAB® programming environment, a constructor may be invoked by assigning to a variable a new instance of a particular class. An instance may be constructed by naming the class. For example, if there exists in the programming environment a definition for a class "File," one can create a new instance (a new object) of that class by using the following command:

x=File;

The class may be defined in the programming environment by the creators of the programming environment, or it may be defined by users or the programming environment, loaded from a file, loaded from a third-party application, be found on the user path, etc. The "File" class is referred to herein merely for illustrative purposes and any number of other handle classes may be used by users of various programming environments and/or applications. For example, in Java or C++, a new object of a given class may be created using the "new" syntax, such as:

x=new File( );

In either case, variable "x" resulting from these object-creation operations is a handle to a handle object. It is a variable whose value is a handle. Whether the variable created from an object instantiation is a handle depends on whether the class whose instance has been created is a handle class.

In addition to inspecting class definitions, there may be ways for determining whether a variable is a handle, provided in a language and/or development or execution environment. For example, in one embodiment, it may be possible to find out if a particular variable is a handle or if a particular underlying object is a handle object, by using command "is a" with a query for a handle. For example, to test whether variable "x" is a handle, one might use the following syntax:

isa (x, 'handle')

this will return "true" given the definition shown above because "File" is a subclass of a handle base class. Alternatively, one can find out whether this is an object of a particular handle class, such as:

isa (x, 'File')

this will also return "true" given the definition above.

The tools for testing whether a given object is a handle may be built into a programming environment. In an alternative embodiment, classes may have introspection methods—that is, methods returning the "type" of the object—whether it is a handle or not. In yet another embodiment, there may be other ways to determine whether an object is a handle object, such as, for example, determining the class hierarchy, etc., as deemed appropriate by one of skill in the art.

In one embodiment, similar syntax may be used to test whether an object is not a handle, just as similar syntax may be used for creating and/or manipulating handle and non-handle objects. For example, a user or a class designer may define a class by the following statement:

classdef foo

In this case, the resulting class "foo" is not a handle class, because it was not specifically designated to be so nor was it designed to derive from a handle class. In an alternative embodiment, handle classes may be default classes, and so may be created without an additional instruction for "handleness," while the non-handle classes may need to be specified to be so.

A base class may be specified in MATLAB code using set-like notation, for example, using the "<" operator:

```
classdef foo < some_base_class
end
```

The resulting class "foo" is a subclass of base class "some_base_class." If "some_base_class" is a handle class, then class "foo" is also a handle class, and if "some_base_class" is not a handle class, then class "foo" is not one either.

In one embodiment, the handle base class allows users of the language that includes a class system of which handle base class is a component to create objects that have the same semantics and behavior as built-in objects to support things like files, windows, system resources, etc. In systems lacking the built-in handle base class, it is often not possible for users to create their own classes having the same semantics as built-in specialized file handles, windows handles, etc., because an application of an equality/assignment operator on the user-built classes would result in a copy of the object being created, which would destroy the uniqueness require-ment of the handle objects. In other systems or languages, all objects may be required to behave like handles or references or handle behaviors may be coupled with other behaviors and not separated into a base class. Therefore, there is a benefit to having a language system that allows for both user-created handle classes inheriting handle behavior from a specialized base class and non-handle classes.

As discussed below, handle classes are not limited to a particular programming language or even a particular class of programming languages. For example, they may be used to aid in graphical programming or to represent elements in graphical languages and/or systems. Window and other graphic user interface element handles are one example of using handle classes for graphical purposes.

Another example may be to use handle classes to represent elements of a graphical modeling system, such as, for example, the Simulink® modeling system. In a graphical modeling system, model elements may be represented by blocks, signals, etc. A graphical element in a model may be unique because of its placement, its input and output signals, and other features. Such an element may benefit from being represented as a handle object. In addition, a block diagram may be associated with a particular model file and/or with a particular window on the screen, so it may combine both the file and the window. A handle object may be used to represent the model as a whole and/or in conjunction with the associated file or window.

A graphical model may also be represented as an intermediate representation using a tree of blocks. No two blocks may be at the same location of the tree. Therefore, using a handle class and/or objects to represent the blocks in a graphical modeling environment may be useful, as determined by one of skill in the art.

Additional examples of the usage of handle classes may include, for example, graphs and their elements, such as, for example, axes of a graph coordinate system. No two axes can exist in the same location under the same figure. An axis might contain one or more "patch" objects that are used to represent polygons. No two patches may also exist in the same order under the same axes. In other words, one patch is always considered to be in front of another. A patch, an axes, and/or a figure may all be represented as handle objects.

Yet another use of handle objects may relate to the Internet and other networks. For example, a handle may refer to a unique network resource, such as, for example, a uniform resource locator (URL), in an object-oriented language environment. A handle may also be used as a proxy for a remote object, such as objects found in a distributed or a parallel environment. A handle may also be used as a representation of a remote process or an application, such as, for example, a remote MATLAB® processing environment or a Component Object Model (COM) server, etc.

Figure 6:
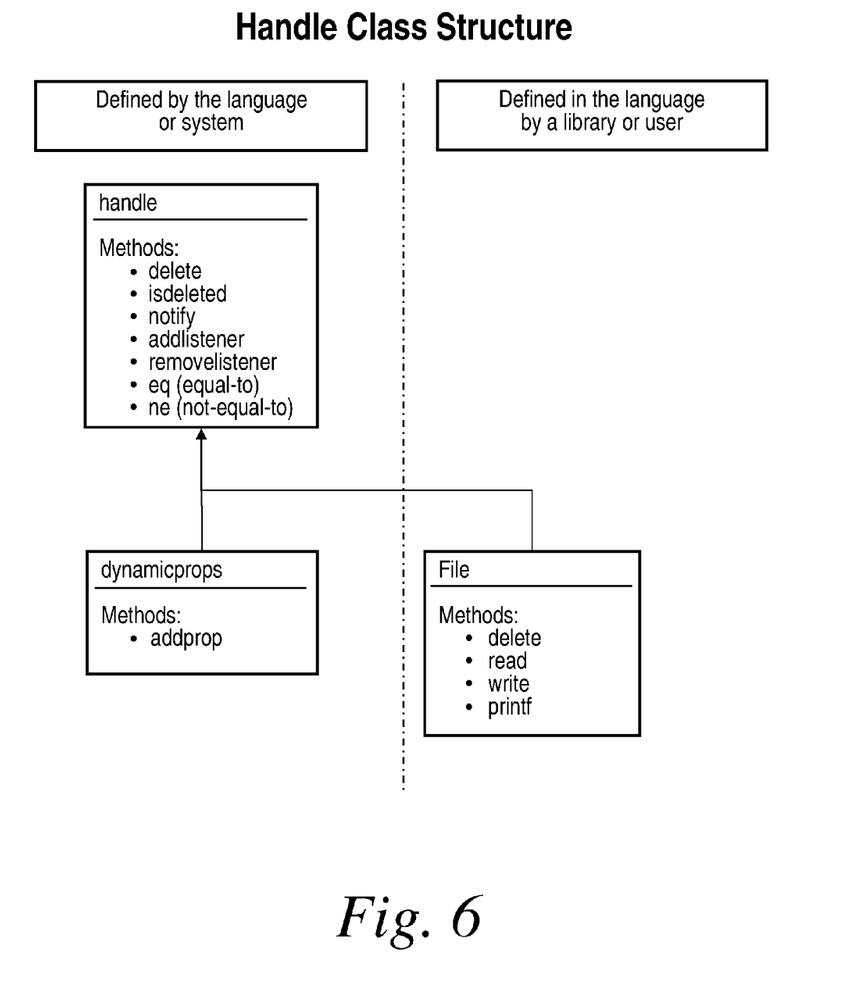
FIG. 6 is an illustrative class structure diagram.

Handle classes may be designed and/or implemented in any number of ways, as determined by one of skill in the art. Shown in FIG. 6 is a unified modeling environment (UML) diagram of one possible handle class implementation and use.

A base handle class may have the following methods:
delete—deletes the underlying object to which a handle object points
isdeleted—checks whether the underlying object to which a handle object points has been deleted
notify—generates an event
addlistener—adds a listener for the event. This is only possible with handle objects, because of their guaranteed uniqueness. With non-handle objects, it would be unclear where the generated event should be caught.

removelistener—remove a listener from the list of event listeners.

eq (equal-to)—check whether two handles are equal—i.e. whether they are the same.

ne (not-equal-to)—check whether two handles are different.

Other or fewer methods and/or state variables may be appropriate for different embodiments.

Various embodiments may be used in a variety of different applications. For example, they may be used by GUI designers, by algorithm designers, etc. In general, embodiments and programs created using embodiments may be employed in various fields, including, but not limited to modeling in engineering, science, math, biological, chemical, mechanical and other disciplines.

Examples of embodiments may include a language processing environment, having at least one handle base class available for subclassing by users of the language processing environment. The language processing environment may receive a definition of at least one handle subclass created by subclassing the at least one handle base class. The language processing environment may provide a single syntax for defining all classes, including handle classes and non-handle classes. The language processing environment may store the definition of the at least one handle subclass in memory and/or display it to users or use it to generate executable code.

Exemplary embodiment may also provide semantics such that instantiation of a handle class allocates storage for all state associated with an instance of the handle class, and subsequent copying of this handle does not copy any of the state associated with the handle. An instance of a handle class (also known as a handle subclass) may be instantiated to create an object corresponding to the instance of the handle class. A variable representing the object corresponding to the instance of a handle subclass may be assigned to another variable such that the assignment does not result in creation of a second object corresponding to an instance of the handle subclass.

Exemplary embodiments may enforce uniqueness of the object corresponding to an instance of the at least one handle subclass. An assignment operator between a first variable representing the object corresponding to an instance of the at least one handle subclass and a second variable may result in assigning to the second variable a reference to the object corresponding to an instance of the at least one handle subclass.

The object corresponding to an instance of the at least one handle subclass may be used to represent at least one or a combination of: a file handle, a system resource handle, a function handle, a window handle, or another graphical user interface element handle.

An exemplary embodiment may be a graphical modeling environment, and the object corresponding to at least one handle subclass may be an element of a graphical model. An embodiment may be a array-based programming environment, such as, for example, an environment capable of processing at least a subset of MATLAB code programming language commands. An embodiment may be capable of processing at least a subset of commands compatible with MATLAB® programming environment.

In response to receiving a command querying whether an object corresponding to at least one instance of a handle subclass is a handle object, embodiments may return a value corresponding to "true." Embodiments may respond to a deletion operation on a variable representing an object corresponding to an instance of a handle subclass by deleting the underlying object.

Handle subclasses may be subclassed by other handle subclasses, and such definitions of handle subclasses may be received by embodiments to instantiate objects corresponding to instances of further handle subclasses. Embodiments may also receive definitions and instantiate non-handle classes and subclasses. Objects corresponding to instances of handle and non-handle subclasses may be processed and/or stored in memory.

The embodiments of the present invention may be implemented on any number of computer platforms, processors, systems, etc. Almost any processor capable of processing computing instructions—that is, instructions in any one of the number of computing representations, including Assembly computer language and/or binary representations—may be used to implement embodiments of the invention. A system for use with one or more embodiments of the invention may be a computer system, a multi-processor system, a multi-core system, a networked computer system, a portable digital device, a field programmable gate array (FPGA), one or more chips, a graphics processing unit (GPU), a processing unit, a virtualized system, etc.

Embodiments may be implemented as instructions stored on one or more computer-readable media. Such media may be hard disks, computer memory, computer cache, removable media, such as portable hard drives, flash drives, optical media, etc. Instructions may be read from the media by one or more computing devices and executed, as arranged by one of skill in the art.

The elements and aspects of the present invention may be extended, supplemented and/or revised, while remaining within the scope of the contemplated invention, as will be understood by one of skill in the art.

The invention claimed is:

1. A non-transitory computer-readable medium storing computer executable instructions, the instructions comprising:
one or more instructions that, when executed by a processor, cause the processor to:
provide a handle base class;
define one or more handle subclasses, where the one or more handle subclasses have a class hierarchy that includes the handle base class;
construct handle objects from the one or more handle subclasses;
use the handle objects, where the handle objects are used exclusively through references to the handle objects;
define one or more non-handle base classes and one or more non-handle subclasses, where the one or more non-handle subclasses have a class hierarchy that includes at least one of the one or more non-handle base classes and does not include the handle base class;
construct non-handle objects from the one or more non-handle subclasses;
use the non-handle objects, where the non-handle objects are used exclusively by value;
store the handle objects and the non-handle objects in a memory coupled to the processor;
provide a first syntax for constructing both the handle objects and the non-handle objects; and
provide a second syntax for using both the handle objects and the non-handle objects.

2. The medium of claim 1, wherein
the second syntax for using both the handle objects and the non-handle objects includes accessing properties and methods of the handle objects and the non-handle objects.

3. The medium of claim 1, wherein the instructions further comprise:
one or more instructions that, when executed by the processor, cause the processor to:
provide semantics such that an instantiation of the one or more handle subclasses allocates storage for all states associated with an instance of the one or more handle subclasses.

4. The medium of claim 1, wherein the instructions further comprise:
one or more instructions that, when executed by the processor, cause the processor to:
receive a definition of at least one of the one or more non-handle sub-classes; and
instantiate a first non-handle object corresponding to an instance of the at least one of the one or more non-handle sub-classes.

5. The medium of claim 1, wherein the instructions further comprise:
one or more instructions that, when executed by the processor, cause the processor to:
assign a variable representing a first handle object to a second variable such that the assignment does not result in creation of a second handle object.

6. The medium of claim 1, wherein the instructions further comprise:
one or more instructions that, when executed by the processor, cause the processor to:
enforce a uniqueness of the handle objects.

7. The medium of claim 6, wherein the instructions further comprise:
one or more instructions that, when executed by the processor, cause the processor to:
as a result of an assignment operator between a first variable representing a first handle object and a second variable,
assign to the second variable a reference to the first handle object.

8. The medium of claim 1, wherein a first handle object represents at least one of:
a file handle,
a system resource handle,
a function handle,
a window handle,
or another graphical user interface element handle.

9. The medium of claim 1, wherein the instructions further comprise:
one or more instructions that, when executed by the processor, cause the processor to:
provide a language processing environment, wherein the language processing environment is a graphical modeling environment, and further wherein a first handle object represents an element of a graphical model in the graphical modeling environment.

10. The medium of claim 1, wherein the instructions further comprise:
one or more instructions that, when executed by the processor, cause the processor to:
provide a language processing environment, wherein the language processing environment is an array-based programming environment.

11. The medium of claim 10, wherein the array-based programming environment is capable of processing at least a subset of MATLAB code commands.

12. The medium of claim 1, wherein the instructions further comprise:
one or more instructions that, when executed by the processor, cause the processor to:
delete a first handle object, the deleting based on a deletion operation on a variable representing the first handle object.

13. The medium of claim 1, wherein the instructions further comprise:
one or more instructions that, when executed by the processor, cause the processor to:
return a value corresponding to "true" in response to a command querying whether a first handle object is a handle-type object.

14. The medium of claim 1, wherein the instructions further comprise:
one or more instructions that, when executed by the processor, cause the processor to:
receive a definition of a new handle subclass created by subclassing at least one of the one or more handle subclasses.

15. The medium of claim 1, wherein the first syntax includes a word "classdef," a name of a class being defined, a less-then sign, and a name of a base class from which the class being defined is a subclass.

16. A computer-implemented method comprising:
providing a handle base class;
receiving computer code, the computer code:
defining one or more handle subclasses, where the one or more handle subclasses have a class hierarchy that includes the handle base class;
constructing handle objects from the one or more handle subclasses;
using the handle objects, where the handle objects are used exclusively through references to the handle objects;
defining one or more non-handle base classes and one or more non-handle subclasses, where the one or more non-handle subclasses have a class hierarchy that includes at least one of the one or more non-handle base classes and does not include the handle base class;
constructing non-handle objects from the one or more non-handle subclasses; and
using the non-handle objects, where the non-handle objects are used exclusively by value;
providing a first syntax for constructing both the handle objects and the non-handle objects; and
providing a second syntax for using both the handle objects and the non-handle objects;
processing, by a processor, the computer code, the processing producing results; and
storing the results in a memory coupled to the processor.

17. The computer-implemented method of claim 16, wherein the processing the computer program code further comprises:
at least one of interpreting and compiling the computer program code.

18. The computer-implemented method of claim 16, wherein the processing the computer program code further comprises:
generating executable code that, when executed, creates one or more instances of the one or more handle subclasses and one or more instances of the one or more non-handle subclasses.

19. The computer-implemented method of claim 18, further comprising:
executing the executable code.

20. The computer-implemented method of claim 19, wherein executing the executable code further comprises:
allocating storage for a state associated with the one or more instances of the one or more handle subclasses.

21. The computer-implemented method of claim 20, wherein the executing the executable code further comprises:
refraining from copying the state associated with the one or more instances of the one or more handle subclasses in response to a command to copy the one or more instances.

22. The computer-implemented method of claim 16, wherein the computer program code comprises at least one assignment operation assigning a first handle object to an assigned variable, the method comprising:
processing the computer program code to generate instructions corresponding to the at least one assignment operation, the instructions refraining from copying to the assigned variable any of the state variables associated with the first handle object.

23. The computer-implemented method of claim 16, further comprising:
ensuring uniqueness of instances corresponding to the one or more handle subclasses in the computer program code.

24. The computer-implemented method of claim 16, wherein the one or more handle subclasses represents at least one or a combination of:
a file handle,
a system resource handle,
a function handle,
a window handle, or
another graphical user interface handle.

25. The computer-implemented method of claim 16, wherein the computer program code comprises code in an array-based language.

26. The computer-implemented method of claim 16, wherein the computer program code comprises code at least a subset of which is capable of being executed in MATLAB programming environment.

27. The medium of claim 16, wherein the instructions further comprise:
one or more instructions that, when executed by the processor, cause the processor to:
provide semantics such that subsequent copying of the one or more handle subclasses does not copy a state associated with the one or more handle subclasses.

28. A method comprising:
providing, in a language processing environment, a handle base class;
receiving a first class definition, the first class definition defining a handle subclass, where the handle subclass has a class hierarchy that includes the handle base class;
constructing, by a processor, one or more handle objects from the handle subclass;
using the one or more handle objects, where the one or more handle objects are used exclusively through references to the one or more handle objects;
receiving a second class definition, the second class definition defining a non-handle base class;
receiving a third class definition, the third class definition defining a non-handle subclass, where the non-handle subclass has a class hierarchy that includes the non-handle base class and does not include the handle base class;
constructing, by the processor, non-handle objects from the non-handle subclass;
using the non-handle objects, where the non-handle objects are used exclusively by value;
storing the one or more handle objects and the non-handle objects in a memory coupled to the processor;
providing, in the language processing environment, a first syntax for constructing both the non-handle objects and the one or more handle objects; and
providing, in the language processing environment, a second syntax for using both the non-handle objects and the one or more handle objects.

29. The method of claim 28 wherein the language processing environment is a graphical modeling environment, and further wherein the one or more handle objects represents an element of a graphical model in the graphical modeling environment.

30. The method of claim 28 wherein the language processing environment is a textual, array-based programming environment having dynamic typing.

31. The method of claim 28 wherein the first class definition includes:
a term, where the term is classdef;
a name for the handle subclass being defined,
a less-then sign, and
a name of the handle base class.

32. The method of claim 28 wherein the third class definition includes:
a term, where the term is classdef;
a name for the non-handle subclass;
a less-then sign, and
a name of the non-handle base class.

33. A non-transitory computer-readable medium storing computer executable instructions, the instructions comprising:
one or more instructions that, when executed by a processor, cause the processor to:
identify a handle base class;
define one or more handle subclasses, where the one or more handle subclasses have a class hierarchy that includes the handle base class;
construct handle objects from the one or more handle subclasses;
use the handle objects, where the handle objects are used exclusively through references to the handle objects;
define one or more non-handle base classes and one or more non-handle subclasses, where the one or more non-handle subclasses have a class hierarchy that includes at least one of the one or more non-handle base classes and does not include the handle base class;
construct non-handle objects from the one or more non-handle subclasses;
use the non-handle objects, where the non-handle objects are used exclusively by value;
store the handle objects and the non-handle objects in a memory coupled to the processor;
provide a first syntax for constructing both the handle objects and the non-handle objects; and
provide a second syntax for using both the handle objects and the non-handle objects.

* * * * *